(12) United States Patent
Ubben et al.

(10) Patent No.: US 9,453,497 B2
(45) Date of Patent: Sep. 27, 2016

(54) METHOD FOR OPERATING A WIND FARM

(71) Applicant: General Electric Company, Schnectady, NY (US)

(72) Inventors: Enno Ubben, Salzbergen (DE); David Forrest Loy, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 14/218,137

(22) Filed: Mar. 18, 2014

(65) Prior Publication Data

US 2015/0267683 A1  Sep. 24, 2015

(51) Int. Cl.
| | |
|---|---|
| F03D 7/00 | (2006.01) |
| F03D 7/02 | (2006.01) |
| F03D 7/04 | (2006.01) |
| F03D 9/00 | (2016.01) |

(52) U.S. Cl.
CPC ............... *F03D 7/00* (2013.01); *F03D 7/028* (2013.01); *F03D 7/048* (2013.01); *F03D 9/005* (2013.01); *F05B 2260/821* (2013.01); *F05B 2270/1033* (2013.01); *F05B 2270/20* (2013.01); *F05B 2270/335* (2013.01); *Y02E 10/723* (2013.01)

(58) Field of Classification Search
CPC .............................. F03D 9/005; Y02E 10/723
USPC ..................................................... 290/44, 55
See application file for complete search history.

(56) References Cited

U.S. PATENT DOCUMENTS

| | | | |
|---|---|---|---|
| 6,724,097 B1 * | 4/2004 | Wobben ........................... | 290/44 |
| 7,372,173 B2 * | 5/2008 | Lutze et al. .................... | 290/44 |
| 7,638,893 B2 * | 12/2009 | Wobben .......................... | 290/55 |
| 8,046,110 B2 | 10/2011 | Mayor et al. | |
| 2006/0132994 A1 * | 6/2006 | Delmerico et al. ............. | 361/20 |
| 2007/0124025 A1 * | 5/2007 | Schram ................ | F03D 7/0224 700/287 |
| 2009/0033096 A1 | 2/2009 | Jurkat | |
| 2009/0033097 A1 | 2/2009 | Jurkat et al. | |
| 2011/0118884 A1 * | 5/2011 | Mayor et al. ................. | 700/287 |
| 2011/0140428 A1 * | 6/2011 | Wakata ................ | F03D 7/0284 290/44 |
| 2014/0103652 A1 * | 4/2014 | Ubben et al. .................... | 290/44 |
| 2014/0103653 A1 * | 4/2014 | Ubben et al. .................... | 290/44 |
| 2015/0292484 A1 * | 10/2015 | Haj-Maharsi ........ | F03D 7/0292 290/44 |

OTHER PUBLICATIONS

Zbigniew et al., "Supervisory Control of a Wind Farm" IEEE Transactions on Power Systems, vol. No. 22, Issue No. 3, pp. 985-994, Aug. 1, 2007.
A European Search Report and Opinion issued in connection with corresponding EP Application No. 15157762 on Jul. 15, 2015.

* cited by examiner

*Primary Examiner* — Tulsidas C Patel
*Assistant Examiner* — Sean Gugger
(74) *Attorney, Agent, or Firm* — GE Global Operations; Douglas D. Zhang

(57) ABSTRACT

The method includes: dividing the wind farm into a first group of wind turbines to be operated in a non-curtailed mode and a second group of wind turbines to be operated in a curtailed mode for providing a power reserve for the wind farm; determining an actual power production of the first group of wind turbines; estimating a possible maximum power production of the second group at a given environmental condition; estimating a possible maximum power output of the wind farm using the actual power production of the first group and the possible maximum power production of the second group; estimating the power reserve using the possible maximum power output; and updating a power setpoint for at least one wind turbine of the second group so that an expected power production of the second group of wind turbines substantially matches a difference between the possible maximum power production and the power reserve Furthermore, a wind farm is provided.

20 Claims, 5 Drawing Sheets

METHOD FOR OPERATING A WIND FARM

BACKGROUND OF THE INVENTION

The subject matter described herein relates generally to wind farms and methods for operating the wind farms, and more particularly, to methods for operating the wind farm in a reserve power mode.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Often, several or a plurality of wind turbines form a wind farm in which the total produced power of the wind turbines is controlled by a supervisory or subordinate control system of the wind farm. Modern wind farms may have a very high installed electrical power, in particular if the wind farm is positioned at locations offering particularly good wind yields, such as at the coast or off-shore, and/or if the wind farm includes a larger number of modern wind turbines. The connection of high power wind farms to a grid may pose challenges regarding grid quality, in particular if the percentage of the power fed by wind farms into the utility grid increases. In this respect, energy suppliers and energy traders, respectively, may require an appropriate behavior of the wind farms in particular during an instability of the grid, e.g. a frequency shift, and/or during an increasing power demand in the grid. For example, the wind farm may be required to operate in a reserve mode in which the wind farm produces less power than possible in order to be able supply extra power when needed. However, this reduces the annual yield of the wind farm.

It would therefore be desirable to provide systems and methods allowing for flexible and reliable operating of wind farms in reserve mode.

BRIEF DESCRIPTION OF THE INVENTION

In one aspect, a method for controlling a wind farm is provided. The method includes: dividing the wind farm into a first group of wind turbines to be operated in a non-curtailed mode and a second group of wind turbines to be operated in a curtailed mode for providing a power reserve for the wind farm; determining an actual power production of the first group of wind turbines; estimating a possible maximum power production of the second group at a given environmental condition; estimating a possible maximum power output of the wind farm using the actual power production of the first group and the possible maximum power production of the second group; estimating the power reserve using the possible maximum power output; and updating a power setpoint for at least one wind turbine of the second group so that an expected power production of the second group of wind turbines substantially matches a difference between the possible maximum power production and the power reserve.

In another aspect, a method for operating a wind farm in accordance with a power reserve request is provided. The method includes: dividing the wind farm into a first group of wind turbines to be operated in a non-curtailed mode and a second group of wind turbines to be operated in a curtailed mode; determining an actual power production of the first group of wind turbines; determining a wind condition for a second group of wind turbines; determining an expected maximum power production for the second group of wind turbines at the wind condition; determining a possible power output of the wind farm using the actual power production of the first group of wind turbines and the expected maximum power production for the second group of wind turbines; determining a power setpoint for at least one wind turbine of the second group using the possible power output of the wind farm, the power reserve request, and the expected maximum power production; and operating the at least one wind turbines in accordance with the power setpoint.

In yet another aspect, a wind farm is provided. The wind farm includes a first group of wind turbines comprising a rotor and a generator connected to the rotor, a second group of wind turbines comprising a rotor and a generator connected to the rotor, a measuring system which is configured to determine individual power productions of the wind turbines of the first group of wind turbines and to determine a wind condition for the second group of wind turbines, and a wind farm control system which is configured to determine an actual power production of the first group of wind turbines from the individual power productions, to calculate a possible maximum power production of the second group of wind turbines at the wind condition, to calculate a possible maximum power output of the wind farm using the actual power production of the first group and the possible maximum power production of the second group, to calculate a desired power reserve for the possible maximum power output, and to calculate a power setpoint for each of the wind turbines of the second group so that an expected power production of the second group of wind turbines substantially matches a difference between the possible maximum power production and the desired power reserve.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind farm and methods for operating the wind farm such that can provide extra power and feed extra power groups into a grid, respectively, on demand. Due to improved estimating the possible power of the wind farm at given environmental condition, the powers reserve requirements can be fulfilled with reduced reduction of annual power yield.

As used herein, the term "blade" is intended to be representative of any device that provides a reactive force when in motion relative to a surrounding fluid.

As used herein, the term "wind turbine" is intended to be representative of any device that generates rotational energy from wind energy, and more specifically, converts kinetic energy of wind into mechanical energy. The term "wind turbine" as used herein shall particularly embrace devices that generate electrical power from rotational energy generated from wind energy.

As used herein, the term "normal operation" intends to describe an operating mode of the wind turbine in which kinetic energy of wind is converted to electrical power.

As used herein, the term "non-curtailed mode" intends to describe an operating mode of the wind turbine in which kinetic energy of wind is converted to electrical power at highest possible rate, i.e. without a power limitation. This means that the wind turbine typically provides in the non-curtailed mode an electric power which is at least close to a maximum possible power output at given wind condition.

Likewise, the term "curtailed mode" intends to describe an operating mode of the wind turbine in which kinetic energy of wind is converted to electrical power at a lower than the highest possible rate, i.e. with a power limitation. This means that the wind turbine typically provides in the curtailed mode substantially less than the maximum possible power output at given wind condition. For example, a curtailed wind turbine may provide electric power in a range from a rated minimum power to less than the possible power, typically from about 5% or 10% to about 99% of possible power, e.g. of rated power at high wind speed.

As used herein, the term "wind farm" is intended to be representative of any system including two or more wind turbines and a wind farm control system adapted to control the overall power output generated by the two or more wind turbines at a connection point, typically a connection point to a power grid or a substation. The wind farm control system is typically a separate unit but may also be a part of one of the wind turbines or even distributed over several wind turbines.

As used herein, the terms "group of wind turbines" and "wind turbine group" are intended to represent any subset of wind turbines of a wind farm, i.e. one or more wind turbines of the wind farm.

Figure 1:
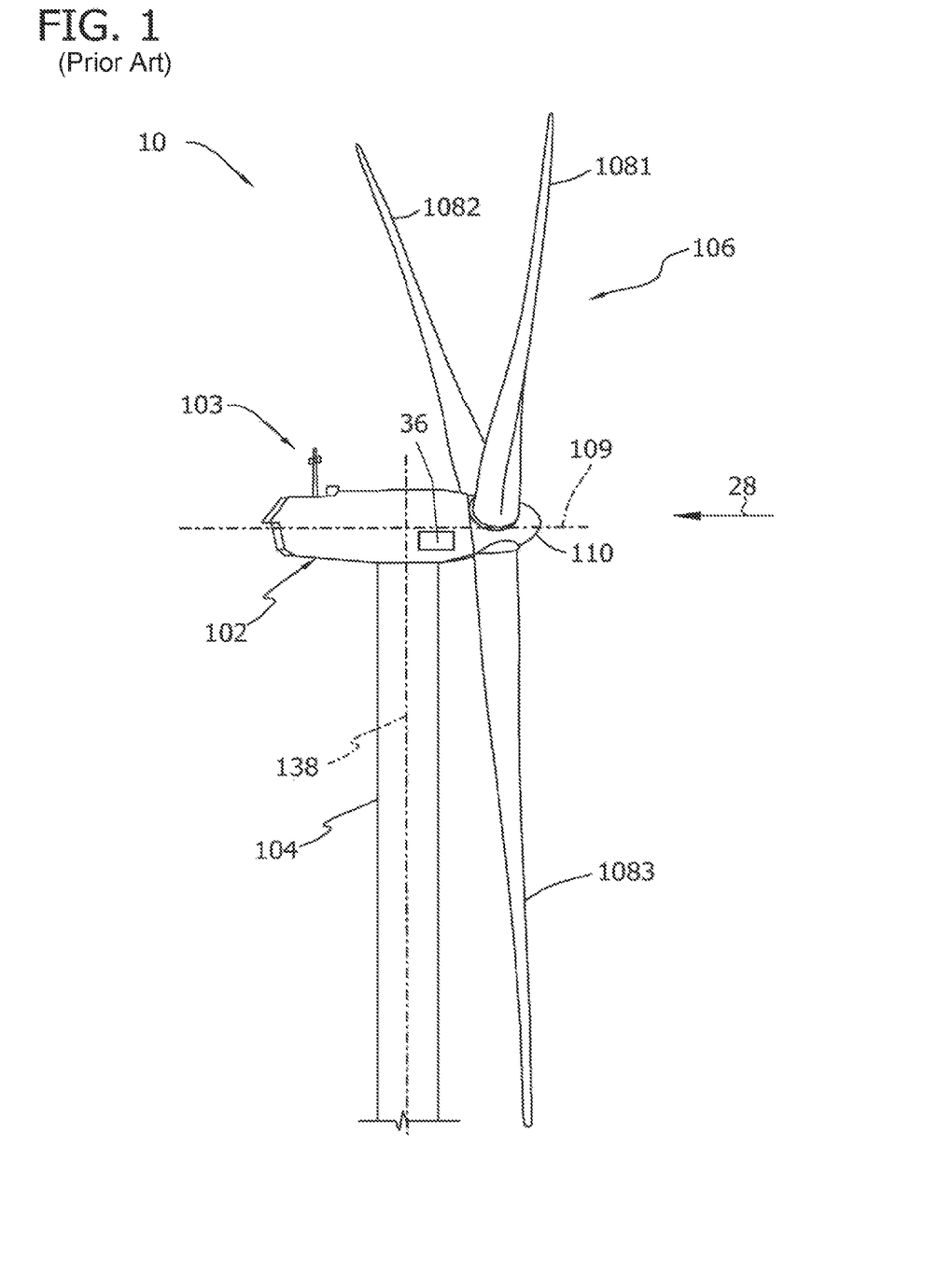
FIG. 1 is a perspective view of a portion of an exemplary wind turbine.

FIG. 1 is a perspective view of a portion of an exemplary wind turbine 10. Wind turbine 10 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 1081, 1082, 1083 attached to a rotating hub 110. Alternatively, wind turbine 100 includes any number of blades that facilitates operation of wind turbine 100 as described herein. In the following a rotor with one or more rotor blades is also referred to as a wind rotor. In the exemplary embodiment, wind turbine 10 includes a gearbox (not shown in FIG. 1) operatively coupled to rotor 106 and a generator (not shown in FIG. 1).

In one embodiment, rotor blades 1081, 1082, 1083 have a length ranging from about 15 meters (m) to about 91 m. Alternatively, rotor blades 1081, 1082, 1083 may have any suitable length that enables wind turbine 10 to function as described herein. For example, other non-limiting examples of blade lengths include 10 m or less, 20 m, 37 m, or a length that is greater than 91 m. As wind strikes rotor blades 1081, 1082, 1083 from a direction 28, rotor 106 is rotated about an axis of rotation 109. As rotor blades 1081, 1082, 1083 are rotated and subjected to centrifugal forces, rotor blades 1081, 1082, 1083 are also subjected to various forces and moments. As such, rotor blades 1081, 1082, 1083 may deflect and/or rotate from a neutral, or non-deflected, position to a deflected position.

Moreover, a pitch angle or blade pitch of rotor blades 1081, 1082, 1083, i.e., an angle that determines a perspective of rotor blades 1081, 1082, 1083 with respect to direction 28 of the wind, may be changed by a pitch adjustment system to control the load and power generated by wind turbine 10 by adjusting an angular position of at least one rotor blade 1081, 1082, 1083 relative to wind vectors.

Nacelle 102 also includes a yaw drive mechanism that may be used to rotate nacelle 102 on a yaw axis 138 to control the perspective of rotor blades 1081, 1082, 1083 and rotor 106, respectively, with respect to local wind direction 28.

Nacelle 102 typically also includes at least one meteorological mast 113 that includes a wind vane and anemometer (neither shown in FIG. 1). Mast 113 provides information such as wind direction and wind speed to a turbine controller 36 for controlling the generator, the pitch adjustment system and/or the yaw drive mechanism.

Figure 2:
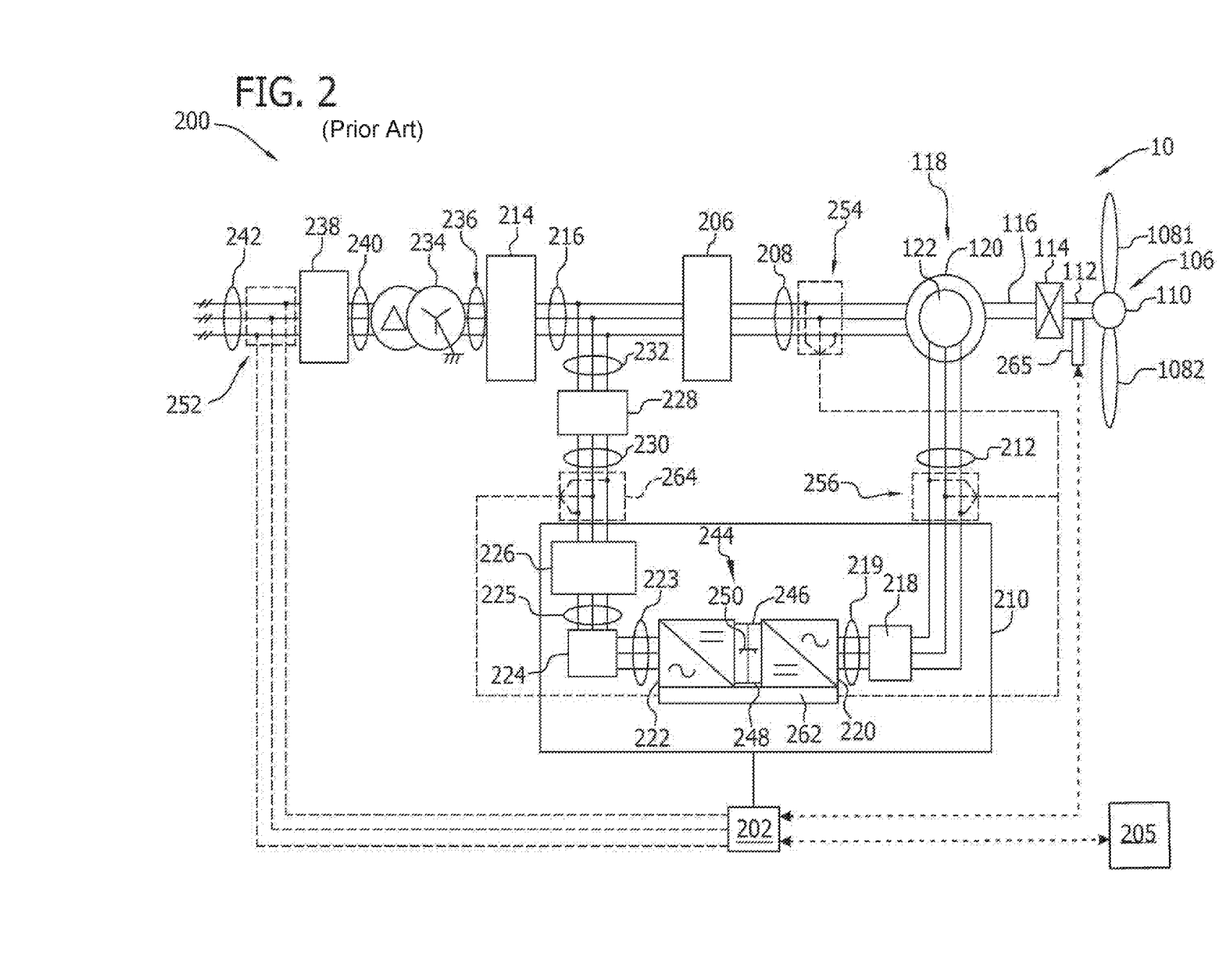
FIG. 2 is a schematic view of an exemplary electrical and control system suitable for use with the wind turbine shown in FIG. 1.

FIG. 2 is a schematic view of an exemplary electrical and control system 200 that may be used with wind turbine 10. Rotor 106 includes blades 1081, 1082 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 10 as described herein. As a further alternative, wind turbine 10 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 10. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 1081, 1082 and blades 1081, 1082 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. In the exemplary embodiment, an encoder 265 connected to low-speed shaft 112 or high speed shaft 116 may be used to measure a rotational speed and/or an angular position of the respective shaft and rotor 106, respectively.

High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power.

The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 1081, 1082. Therefore, in this manner, mechanical and electrical rotor frequencies are decoupled from stator frequency. Accordingly, generator 118 is a variable speed generator.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 10 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, turbine controller 202 is connected with a wind farm control system 205 operating as a supervisory control for the turbine controller 202. This is explained in more detail with regard to FIG. 3.

Figure 3:
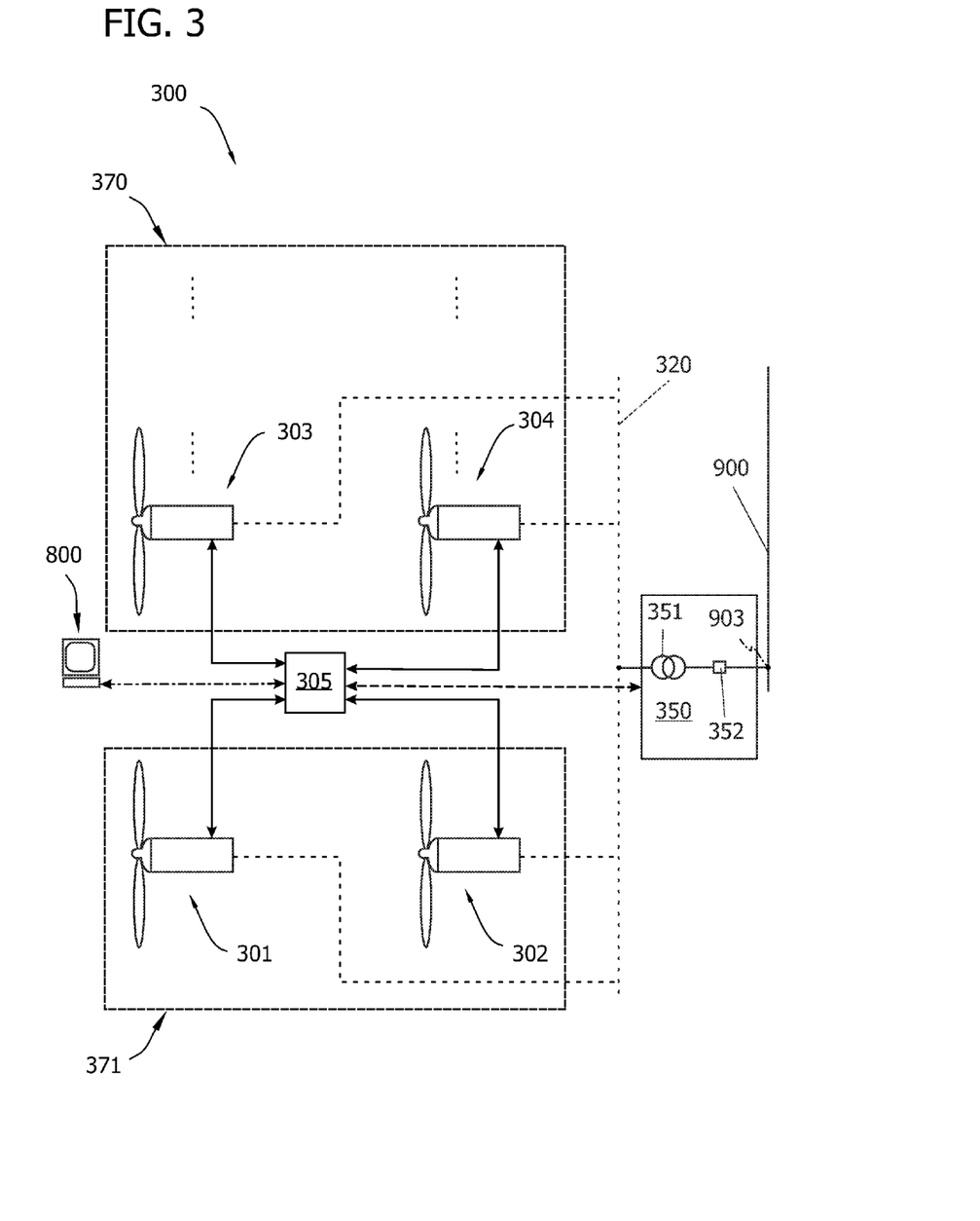
FIG. 3 is a schematic view of a wind farm according to an embodiment.

In FIG. 3 a schematic illustration of a wind farm 300 is shown. In the exemplary embodiment, four wind turbines 301 to 304 which may be similar as explained above with regard to FIG. 1 and FIG. 2 are connected via an internal grid 320 with a transformer substation 350. Note that FIG. 3 shows, for sake of simplicity, only four wind turbines 301-304. Large wind farms can have more than hundred wind turbines controlled by one central controller 305 operating as wind farm control system. Controller 305 is typically located in a separate substation but may also be part of one of the wind turbines. As explained above, the wind farm control system 305 may be centralized or distributed over the wind turbines.

The power produced by wind turbines 301 to 304 may be stepped up in voltage by turbine transformers (not shown) before being coupled to the internal grid 320. The internal grid 320 is typically a medium voltage, three-phase alternating current (ac) network operating e.g. at a few kV up to a few 10 kV and 50 Hz or 60 Hz. A station transformer 351 of the transformer substation 350 is typically used to step up voltage from the internal grid voltage to a required transmission voltage of the external, main or utility grid 900 to which the transformer substation 400 can be connected at the point-of-common-coupling (PCC) 903 using a suitable power switch 352. Further, the internal grid 320 may power the central controller 305 and/or the wind turbines 301 to 304.

In an ac electric system the current, I, and the voltage, V, can be out of phase. Consequently, the product of current and voltage $S=I*V$ can be complex. In the context of this application, the term power shall embrace, the complex power, the active or real power $P=Re(S)$, i.e. to the energy that is transferred per unit of time and the imaginary part of S referred to as reactive power $Q=Im(S)$. Likewise, the tem "power setpoint" shall embrace setpoints for complex power, active power and reactive power that may be issued to wind turbine controllers as setpoints for controlling the power production of the respective wind turbine.

The central controller 305 is arranged for communication with the wind turbines 301 to 304 via communication links (full arrows), which may be implemented in hardware and/or software. Typically, the communication links 550 are realized as an Ethernet LAN which will also enable remote control using a SCADA (Supervisory, Control and Data Acquisition) computer 800. However, the communication links (arrows) may also be configured to remotely communicate data signals to and from the central controller 305 in accordance with any fiber optic, wired or wireless communication network known to one skilled in the art. Such data signals may include, for example, signals indicative of operating conditions of individual wind turbine which are transmitted to the central controller 305 and various command signals communicated by the central controller 305 to the wind turbines 301 to 304 to supervise the power production of the wind turbines 301 to 304. Note, that the full and dashed-dotted arrows in FIG. 3 only indicate that there are links between the central controller 305 and the other devices. They do not necessarily reflect the topology of the used communication links.

Further, the central controller 305 is typically operable to control the power switch 352 and/or various switching devices or actuators (not shown), such as feeders, power switches, capacitors and reactors via additional communication links (not shown), for example a CAN (Controller Area Network)—bus, to control e.g. frequency, active and reactive power output of the wind farm 300.

In other words, the central controller 305 is operable as a wind farm control system and wind farm controller, respectively, and typically performs a closed loop control or regulation such that the wind farm 300 produces active and reactive power according to given request or global set points of the wind farm 10. It should be understood, that the term "control" can also refer to "regulate" or "regulation".

In a conventional control mode, the central controller 305 may read the actual reactive power and actual (real or active) power at the PCC 903, compare the measured values with the global set points and issue power and VAR (voltage-ampere-reactive) commands or set points to each wind turbine 301-304 on any deviation. This also effectively makes the wind farm 300 acts as a single power production unit instead of individual wind turbines.

According to an embodiment, the wind farm 300 is divided into two groups 370, 371 of wind turbines, a first group or first subset 370 of wind turbines to be operated in a non-curtailed mode to provide maximum available power based on wind speed and a second group or second subset 371 of wind turbines to be operated in a curtailed mode for providing a power reserve for the entire wind farm 300. In the following, the first group 370 and the second group 371 are also referred to as base segment 370 and reserve segment 371, respectively, of the wind farm 300. Note that additionally feeding the power reserve of wind farm 300 into the grid 900 may be requested for a short time of a few seconds up to minutes or even hours. Accordingly, latent power stored in wind turbines rotors (inertial energy of the rotors) is too low in many circumstances.

In the exemplary embodiment, second group (reserve segment) 371 has two wind turbines 301, 302. This is however only an example. Further, only two wind turbines 303, 304 of first group (base segment) 370 are illustrated in FIG. 3 for sake of clarity. First group 370 may have more than 50 or even more than 100 wind turbines. This is indicated by the dotted vertical lines in dashed box 370 of FIG. 3. Further, first group 370 has typically more wind turbines than the second group 371.

Even further, the allocation (clustering) of the wind turbines into the two groups of wind turbines 370, 371, may change during operation of the wind farm 300. For example, controller 305 may be configured to reallocate the wind turbines during operation. As wind turbines of the second group 371 are exposed to lower loads, regularly reallocating (exchanging) the wind turbines may be used to more equally distribute the load in the wind farm. Accordingly, maintenance costs and/or downtimes may be reduced.

Typically, only a view number of wind turbines are required to provide the reserve for the entire wind farm 300. A required power reserve of the wind farm 300 may be in a range between about 1% and 5% of the wind farms output power fed to the grid 900.

According to an embodiment, the required number $N_R$ of wind turbines for the reserve segment 371 is for each percentage of the required power reserve $P_R$ determined by about 5% of online turbines $N_O$ which may correspond to the total number of wind turbines of the wind farm 300 or less, e.g. due to maintenance:

$N_R=N_O*P_R/20\%$, where $N_R$ is determined as a rounded or truncated integer value. For example, for a 1% power reserve ($P_R=1\%$), 95% of the turbines are allocated to the base segment 370 and stay un-curtailed and 5% of the turbines are allocated to the reserve segment 371 to provide the reserve for the entire wind farm 300.

Typically, wind farm controller 305 recalculates $N_R$ and, if changed, reallocates the wind turbines when the number $N_O$ of online wind turbines changes or when a new power reserve request is received.

Further, wind farm controller 305 typically reallocates the wind turbines 301-304 if a wind turbine is to be shut down or raises an error exception or warning message.

Furthermore, a timer may be used to regularly exchange the wind turbines in reserve segment 371 with wind turbines allocated to the base segment 370.

In particular the wear in the wind turbines pitch system may substantially be reduced and the life time of the pitch systems be increased by regularly reallocating the wind turbines. According to an estimate, more than 200000 hours maintenance time for the pitch systems may be saved during the average life time of a wind farm 300 with 95 wind turbines in the base segment 370 and 5 wind turbines in the reserve segment 371 by regularly exchanging the wind turbines in the reserve segment 371 and the base segment 370, respectively (swapping the allocation of turbines between base and reserve segment 370, 371).

For example, in a first time interval of e.g. one hour the wind turbines 1 to 5 may form the reserve segment 371. In a subsequent second time interval the wind turbines 6 to 10 may form the reserve segment 371 and so forth. Accordingly, the operation time in reserve mode (curtailment operation time) may be substantially equal for all wind turbine of wind farm 300.

A timer can be used to trigger the re-allocation of the turbines after a configured time (e.g. one hour). Typically, the availability of turbines in the wind farm is also verified. When a wind turbines gets unavailable for the reserve segment (due to maintenance, error-state, low wind condition or the like), a new wind turbine may be moved from the base segment 370 to the reserve segment (371). The wind turbine with the lowest curtailment operation time may be selected as new wind turbine.

In other embodiments, the operation time of the wind turbines in the reserve segment 371 may depend on their maintenance state, load state, error state and/or wind condition, for example low wind condition.

Furthermore, the wind turbines of the base segment 370 may at least temporarily be operated using the so-called pitch less strategy. Accordingly, the power production of the wind farm 300 may be increased.

The actual power production of the base segment 370 may be directly determined from the actual power outputs of the wind turbines 303, 304. Typically, wind farm controller 305 determines the actual power production of the base segment 370 as a sum of measured values of the individual actual power outputs of the wind turbines 303, 304 in the base segment 370. Thus, the actual power production of the base segment 370 represents the total real capability of the corresponding wind turbines 303, 304.

According to an embodiment, the possible maximum power production of the reserve segment 371 is typically determined by wind farm controller 305 as a sum of estimated possible maximum power of the wind turbines 301, 302 at given environmental condition. In the following, the estimated possible maximum power is also referred to as expected maximum power production. The expected maximum power production of the individual wind turbines 301, 302 may be obtained by measuring the local wind speed using e.g. an anemometer of the respective wind turbine, and calculating a corresponding maximum power from a reference power curve or a look-up table. Alternatively or in addition, simulation may be used to determine the possible maximum power at given wind condition.

Thereafter, the wind farm controller 305 may calculate a possible maximum power output of the wind farm 300 using the actual power production of the base segment 370 and the possible maximum power production of the reserve segment 371. Typically, the possible maximum power output of the wind farm 300 is calculated as sum of the actual power production of the base segment 370 and the possible maximum power production of the reserve segment 371 which is typically reduced by expected wind farm losses.

Thereafter, the wind farm controller 305 may calculate a desired power reserve for the possible maximum power output. For example, the wind farm controller 305 may have received a power reserve request as a percentage of power fed into the grid. In this embodiment, the wind farm controller 305 calculates the desired power reserve as corresponding fraction of the possible maximum power output.

Thereafter, the wind farm controller 305 may, while the wind turbines of the base segment 370 are operated in the non-curtailed mode, determine and issue power setpoint for the wind turbines 301, 302 of the reserve segment 371 so that an expected power production of the reserve segment substantially matches a difference between the possible maximum power production of the wind farm and the desired power reserve. Accordingly, the requested power reserve may be provided with reduced reduction of annual power yield.

Compared to estimating the possible maximum power production of the wind farm using wind speed measurement and a reference power curves for all the turbines in the wind farm, the possible power estimate of the described approach is expected to be improved, for example by a factor of 20 for a 1% power reserve. This is due to the reduced contribution of wind speed measurement based power estimation of the wind farm 300. Note that only about 5% of the wind turbines are allocated to the reserve segment 371 for a 1% power reserve. Thus, their contribution to the possible maximum power output of the wind farm 300 is also only about 5%.

Accordingly, the wind farm 300 may be controlled in reserve mode with smaller safety margin regarding the power reserve. Thus, the annual yield of wind farm 300 may be increased.

After receiving a power reduction request for the wind farm 300, wind farm controller 305 typically operates all wind turbines 301-304 in a corresponding curtailed mode. For example, all wind turbines 301-304 may be allocated to the reserve segment 371. In this event, determining the power reserve with high accuracy is typically not required.

Figure 4:
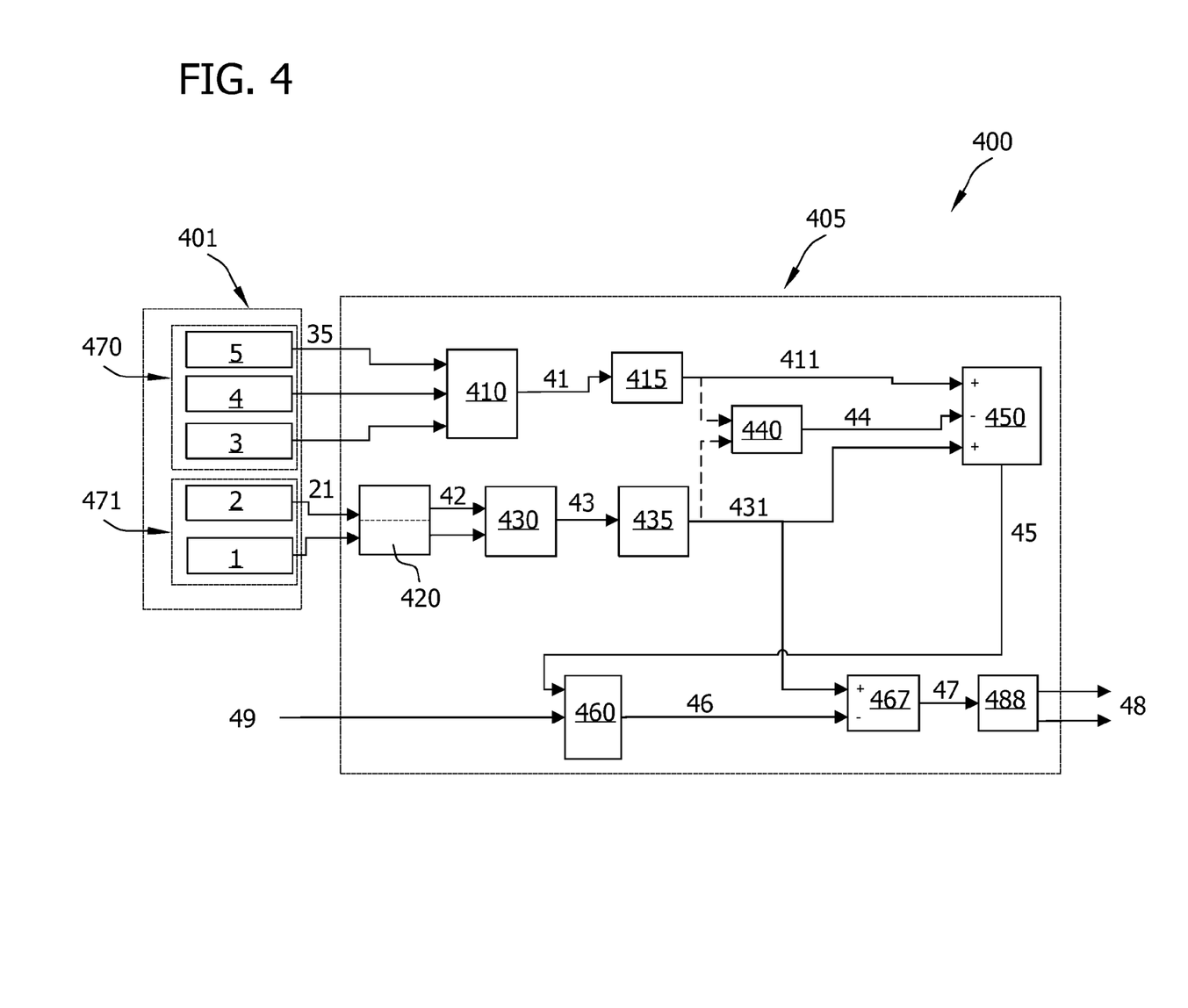
FIG. 4 is a block diagram of a wind farm control system according to an embodiment.

FIG. 4 shows a block diagram of a part of a wind farm control system 405 that may be used to control a wind farm 400 in accordance with a power reserve request 49 for the wind farm 400. Wind farm 400 may be similar to the wind farm 300 explained above with regard to FIG. 3.

Typically, wind farm 400 includes a measuring system 401 for measuring individual power productions 35 of the wind turbines of a first group 470 of wind turbines (base segment) and for measuring wind conditions 21 of the wind turbines of the second group 471 of wind turbines (reserve segment).

Similar as explained above with regard to FIG. 3, the wind farm control system 405 may include additional units (not shown in FIG. 4) to divide and/or reallocate the wind turbines into the first and second groups 470, 471.

Accordingly, each of the wind turbines of wind farm 400 typically includes a wind measuring system 1, 2 such as an anemometer to determine the local wind condition 21 (in particular local wind speed) and a suitable power measuring system 3, 4, 5 such as a power meter to determine the output power. In this embodiment, measuring system 401 is distributed over the wind turbines. Note that the wind measuring systems 1, 2 and power measuring systems 3, 4, 5 shown in FIG. 4 typically correspond to five different wind turbines of wind farm 400. For sake of clarity, controlling of wind farm 400 is described with respect to five wind turbines only.

The wind conditions 21, in particular the local wind speeds are typically used as input values for a power estimator 420 to calculate possible maximum power productions 42 of the individual wind turbines. As indicated by the dashed line in box 420, a separate power estimator 420 may be used for each wind turbine of the second group. For example, each wind turbine of wind farm 400 may have its own power estimator 420 which outputs the calculated possible maximum power production 42 of the respective wind turbine.

Wind farm control system 405 typically uses an adder 430 to calculate a possible maximum power production 43 of second group 471 as a sum of the possible maximum power productions 42 of the individual wind turbines of group 471. An optional average unit 435 or a low-pass filter, for example a first order low-pass filter 435 may be used to form a noise-reduced value 431 of the possible maximum power production 43 of second group 471.

In the exemplary embodiment, wind farm control system 405 further includes an adder 410 to determine the actual power production 41 of the first group 470 as a sum of the individual power productions 35 fed into adder 410. Further, an optional average unit 415 or a low-pass filter, for example a first order low-pass filter 415 may be used to form a noise reduced value 411 of the actual power production 41.

The possible maximum power production 43 of second group 471 and its noise-reduced value 431, respectively, and the actual power production 41 of the first group 470 and its noise-reduced value 431, respectively, are used as inputs of a wind farm power estimator unit 450 for calculating a possible maximum power output 45 of wind farm 400. Typically, the possible maximum power output 45 of wind farm 400 is calculated as a sum of the possible maximum power production 43 of second group 471 and its noise-reduced value 431, respectively, and the actual power production 41 of the first group 470 and its noise-reduced value 431, respectively, reduced by expected losses 44 of wind farm 400.

Expected losses 44 may be calculated by a loss estimator unit 440 that typically sums internal losses such as the power used for a central controller, the wind turbines, the measuring system 401, power conversion losses (voltage step-up) and the like. For example, the possible maximum power production 43 of second group 471 and its noise-reduced value 431, respectively, and the actual power production 41 of the first group 470 and its noise-reduced value 431, respectively, may be used as inputs of the loss estimator unit 440 to determine expected power conversion losses.

To calculate a desired power reserve 46 for wind farm 400, the possible maximum power output 45 of wind farm 400 and the external power reserve request 49 may be fed into a power reserve unit 460 which typically calculates the power reserve 46 as a corresponding fraction of the possible maximum power output 45, for example a hundredth of the possible maximum power output 45 for an external power reserve request 49 of 1%.

In a subunit 467, an expected power production 47 (required power production) for the second group 471 may be determined by calculating a difference between the possible maximum power production 43, 431 and the desired power reserve 46.

The expected power production 47 may be issued as a group power setpoint 47 to a power distributing unit 488 configured to calculate and issue individual power setpoints 48 to the wind turbines of the second group 471.

Accordingly, the wind farm control system 405 is configured to calculate power setpoint(s) for each the wind turbine(s) of the second group 471 so that the expected power production 47 of the second group 471 substantially matches the difference between the possible maximum power production 43, 431 and the desired power reserve 46.

The method performed by the wind farm control system 405 may in an embodiment be described as: dividing or allocating the wind farm 400 into a first group 470 of wind turbines to be operated in a non-curtailed mode and a second group 471 of wind turbines to be operated in a curtailed mode; determining an actual power production 41, 411 of the first group 470; determining a wind condition for the second group 471; determining an expected maximum power production 43, 431 for the second group 471 at the wind condition; determining a possible power output 45 of the wind farm using the actual power production 41, 411 and the expected maximum power production 31, 311; determining power setpoint(s) 48 for at least one wind turbine of the second group 471 using the possible power output 45, the power reserve request 49, and the expected maximum power production 43, 431; and operating the at least one wind turbines of the second group 471 in accordance with the power setpoint(s) 48.

Note that the functions of wind farm control system 405 may be realized with another topology. In the following, further related methods for operating a wind farm are explained.

Figure 5:
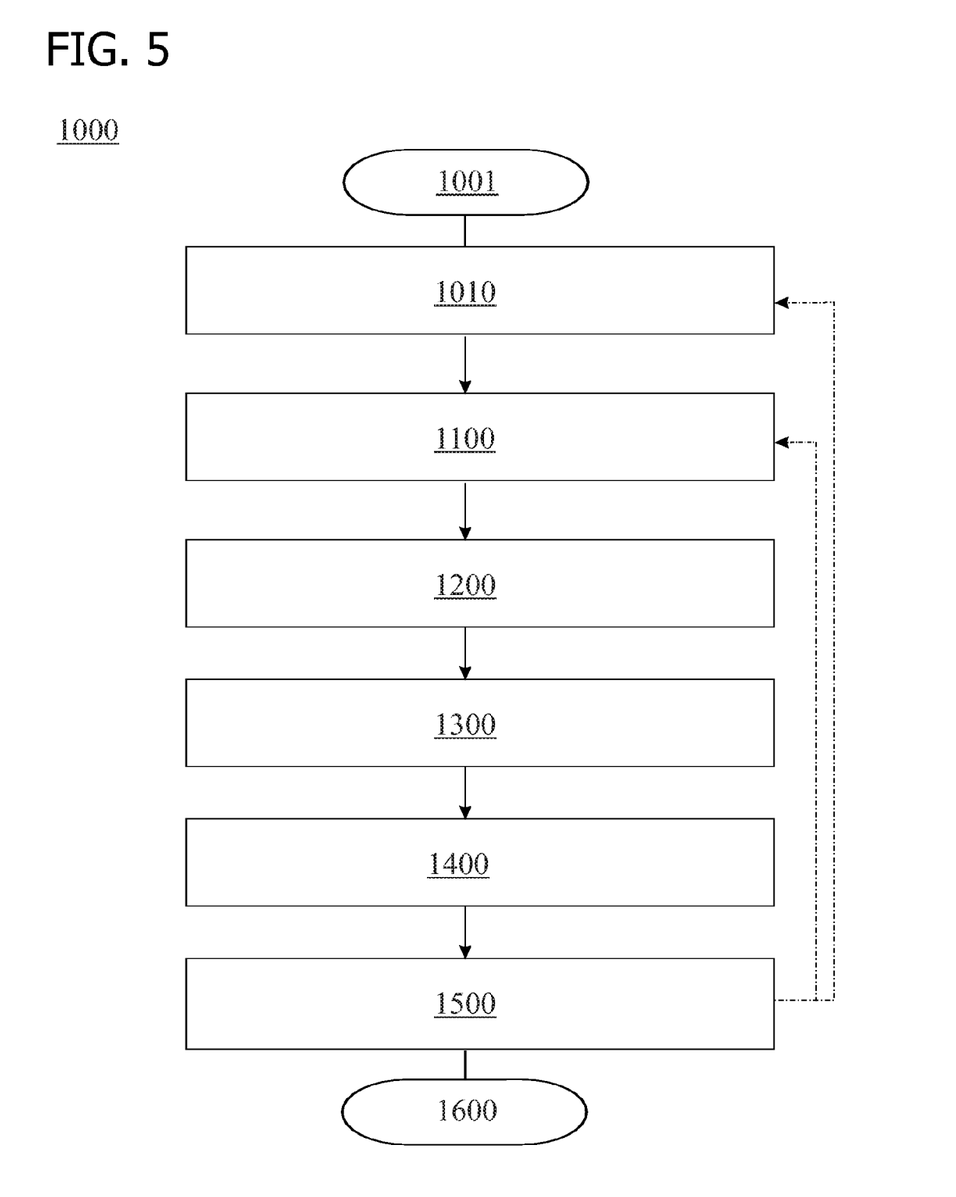
FIG. 5 illustrates a flow diagram of a method for operating a wind farm according to an embodiment.

FIG. 5 is a flow diagram of a method 1000 for operating a wind farm, for example a wind farm as explained above with regard to FIGS. 3 and 4.

After starting in block 1001, the wind turbines are divided (allocated) into a first group of wind turbines (base segment) to be operated in a non-curtailed mode and a second group of wind turbines (reserve segment) to be operated in a curtailed mode for providing a power reserve for the wind farm in a block 1010. This may be done prior to, for example prior to connecting the wind farm to a grid (offline), or during normal operation of the wind farm (online).

In block 1010, a required number of wind turbines for the second group ensuring a large enough power reserve may be determined in accordance with a power reserve request prior to selecting the wind turbines for the second group.

Thereafter, an actual power production of the first group of wind turbines may be determined in a block 1100. This may include measuring values of the actual power production for each of the wind turbines of the first group of wind turbines, determining a sum of the values of the actual power production, and/or low-pass filtering the sum.

Thereafter, a possible maximum power production of the second group of wind turbines at a given environmental condition may be estimated in a block 1200. This may include determining local wind conditions (wind speed and/or wind direction and/or air density and/or temperature) for the wind turbine(s) of the second group of wind turbines, and calculating possible maximum power production(s) the wind turbine(s) of the second group of wind turbines at the wind condition(s).

The order of blocks 1100 and 1200 may also be reversed. Furthermore, the blocks 1100, 1200 may be carried out in parallel.

In a block 1300, a possible maximum power output of the wind farm is estimated using the actual power production of the first group and the possible maximum power production of the second group. This may include determining a sum of the actual power production of the first group of wind turbines and the possible maximum power production for the second group of wind turbines, determining expected losses of the wind farm, and subtracting the expected losses of the wind farm from the sum.

In a subsequent block 1400, the power reserve may be estimated for the possible maximum power output, typically as a fraction the possible maximum power output in accordance with a received external using a power reserve request.

In a subsequent block 1500, power setpoint(s) are updated for the wind turbine(s) of the second group so that an expected power production of the second group of wind turbines substantially matches a difference between the possible maximum power production and the power reserve. This may include subtracting the power reserve from the expected possible power production to determine a desired power production of the second group, determining a group power setpoint for the second group of wind turbines in accordance with the desired power production, dividing the group power setpoint into individual setpoints for the wind turbines of the second group, and issuing the individual setpoints to the wind turbines of the second group.

Typically, the individual setpoints for the wind turbines of the second group are determined such that the wind turbines of the second group are curtailed to the same fraction or percentage of their individual possible maximum power. This ensures in an easy and safe manner that the wind farm meets the external power reserve requirements. Further, this algorithm for determining individual power setpoints also works for second groups having wind turbines of different rated power and/or different power constrictions. Therefore, this algorithm may also be used unchanged if the composition of the second group changes, e.g. due to a reallocation of the wind turbines.

For example, the group power setpoint for the second group may be determined as a ratio R between the desired power production (expected power production to provide the power reserve) of the second group and the possible maximum power production of the second group, or as a corresponding percentage. The possible maximum power production of the second group of wind turbines is typically determined as a sum of the individual possible maximum power productions of the wind turbines of the second group at given environmental conditions. Thus, the individual power setpoints for the wind turbines of the second group may be determined using the individual possible maximum power productions and the ration R, typically as R times the respective individual possible maximum power production.

In other embodiments, the algorithm for determining the individual power setpoints for the second group may also take into account other factors such as individual load states of the wind turbines. For example, wind turbines of the second group having a higher load state may be curtailed to a lower fraction of their individual possible maximum power than the others. Accordingly, the load distribution may become more uniform during operation.

Prior to issuing the individual setpoints, it is typically checked if the power setpoints are below a respective minimum value.

Thereafter, method 1000 may return to block 1010, or block 1100 to realize a close-loop control as indicated by the dashed arrows. Method 1000 may also return to block 1200 or even blocks 1100 and 1200 if the blocks 1100, 1200 are performed in parallel. Alternatively, method 1000 may be ended in a block 1600.

A first timer may be used to return in short time intervals of typically a few seconds or even less than a second to block 1100 and/or block 1200.

Typically, a second timer is used to return regularly, for example once per hour, to block 1010. Accordingly, selecting the wind turbines for the second group (reallocating) is performed in regular time intervals. This may be done in accordance with a maintenance state of the wind turbines, a load state of the wind turbines, a wind condition of the wind turbines, an error state of the wind turbines and/or a curtailment operation time of the wind turbines.

Even further, method 1000 may return to block 1010 if an error message or an exception is raised by a wind turbines of the second group that may require a reallocation of the wind turbine, e.g. due to a failure or a required shut down of that wind turbine.

In an event of receiving a curtailment request for the whole wind farm, method 1000 is typically ended. After subsequent allocating all wind turbines of the wind farm to the second group, a similar method may be entered in which the steps of blocks 1200 to 1500 are carried out, typically also in a closed-loop manner.

If the curtailment request for the whole wind farm is overwritten or cancelled, method 1000 may be reentered.

Exemplary embodiments of systems and methods for coordinated operating the wind farm in accordance with a power reserve request are described above in detail. Due to an improved estimate of the possible maximum power output of the wind farm, the overall energy production of the wind farm may be increased and/or the maintenance cost reduced compared to other reserve power operation schemes.

The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a wind farm having a plurality of wind turbines, the method comprising:
   (a) calculating an actual power output for each of the wind turbines;
   (b) calculating an estimated possible maximum power output for each of the wind turbines based on a given environmental condition;
   (c) dividing the wind farm into a first group of wind turbines to be operated in a non-curtailed mode and a second group of wind turbines to be operated in a curtailed mode for providing a power reserve for the wind farm, wherein the first group of wind turbines includes more wind turbines than the second group of wind turbines;
   (d) determining an actual power production of the first group of wind turbines by summing the actual power output from the wind turbines in the first group;
   (e) determining a possible maximum power production of the second group of wind turbines by summing the estimated possible maximum power output from the wind turbines in the second group;
   (f) determining a possible maximum power output of the wind farm using the actual power production of the first group of wind turbines and the possible maximum power production of the second group of wind turbines;
   (g) determining the power reserve using the possible maximum power output of the wind farm;
   (h) updating a power setpoint for at least one wind turbine of the second group of wind turbines so that an expected power production of the second group of wind turbines substantially matches a difference between the possible maximum power production and the power reserve; and
   (i) regrouping the wind turbines of the wind farm into different first and second groups of wind turbines based on turbine availability and a curtailment schedule and repeating steps (d) through (h).

2. The method of claim 1, wherein dividing the wind farm comprises at least one of:
   receiving a power reserve request;
   determining a number of wind turbines for the second group of wind turbines to provide the power reserve in accordance with the power reserve request; and
   selecting the wind turbines for the second group.

3. The method of claim 2, wherein selecting the wind turbines is performed in regular time intervals.

4. The method of claim 2, wherein selecting the wind turbines is performed in accordance with a maintenance state of the wind turbines, a load state of the wind turbines, a wind condition of the wind turbines, an error state of the wind turbines and/or a curtailment operation time of the wind turbines.

5. The method of claim 1, wherein determining the actual power production of the first group of wind turbines comprises at least one of:
   measuring a value of the actual power production for each of the wind turbines of the first group of wind turbines;
   determining a sum of the values of the actual power production; and
   filtering the sum.

6. The method of claim 1, wherein determining the possible maximum power production of the second group of wind turbines comprises at least one of:
   determining a wind condition at least for the at least one wind turbine of the second group of wind turbines; and
   calculating a possible maximum power production of the at least one wind turbine of the second group of wind turbines at the wind condition.

7. The method of claim 1, wherein determining the possible maximum power output of the wind farm comprises at least one of:
   determining a sum of the actual power production of the first group of wind turbines and the possible maximum power production for the second group of wind turbines;
   determining expected losses of the wind farm; and
   subtracting the expected losses of the wind farm from the sum.

8. The method of claim 1, wherein determining the power reserve comprises at least one of: calculating the power reserve using a power reserve request and the possible maximum power production of the wind farm.

9. The method of claim 1, wherein the actual power production of the first group of wind turbines is determined as an estimate after receiving a curtailment request for the wind farm.

10. The method of claim 1, wherein updating the power setpoint comprises at least one of:
    determining a power setpoint at least for the at least one wind turbine of the second group so that an expected power production of the second group of wind turbines substantially matches a difference between the possible maximum power output and the power reserve; and
    issuing the power setpoint to the at least one wind turbine.

11. The method of claim 10, wherein determining the power setpoint comprises at least one of:
    subtracting the power reserve from the expected possible power production to determine a desired power production of the second group;
    determining a group power setpoint for the second group of wind turbines in accordance with the desired power production;
    dividing the group power setpoint into individual setpoints; and calculating the power setpoint in accordance with the desired power production.

12. The method of claim 11, further comprising checking if the power setpoint is below a minimum value.

13. The method of claim 1, wherein at least a part of the method is performed as a close-loop control.

14. A method for operating a wind farm in accordance with a power reserve request, the wind turbine having a plurality of wind turbines, the method comprising:
   (a) calculating an actual power output for each of the wind turbines;
   (b) calculating an estimated possible maximum power output for each of the wind turbines based on a given environmental condition;
   (c) dividing the wind farm into a first group of wind turbines to be operated in a non-curtailed mode and a second group of wind turbines to be operated in a curtailed mode for providing a power reserve for the wind farm, wherein the first group of wind turbines includes more wind turbines than the second group of wind turbines;
   (d) determining an actual power production of the first group of wind turbines by summing the actual power output from the wind turbines in the first group;
   (e) determining a wind condition for the second group of wind turbines;
   (f) determining an expected maximum power production for the second group of wind turbines at the wind condition by summing the estimated possible maximum power output from the wind turbines in the second group;
   (g) determining a possible power output of the wind farm using the actual power production and the expected maximum power production;
   (h) determining a power setpoint for at least one wind turbine of the second group using the possible power output, the power reserve request, and the expected maximum power production;
   (i) operating the at least one wind turbines in accordance with the power setpoint; and
   (j) regrouping the wind turbines of the wind farm into different first and second groups of wind turbines based on turbine availability and a curtailment schedule and repeating steps (d) through (i).

15. The method of claim 14, further comprising;
   determining a possible power production of the wind farm as a sum of the actual power production of the first group of wind turbines and the possible power production for the second group of wind turbines, and
   subtracting expected losses of the wind farm from the sum to determine the possible power output of the wind farm.

16. The method of claim 14, wherein determining the power setpoint comprises at least one of:
   calculating the power reserve using the power reserve request and the possible power production of the wind farm;
   subtracting the power reserve from the expected possible power production to determine a desired power production of the second group;
   determining a group power setpoint for the second group of wind turbines in accordance with the desired power production;
   dividing the group power setpoint into individual setpoint;
   calculating the power setpoint in accordance with the desired power production; and
   issuing the power setpoint to the at least one wind turbine.

17. A wind farm having a plurality of wind turbines, the wind farm comprising:
   a first group of wind turbines comprising a rotor and a generator connected to the rotor;
   a second group of wind turbines comprising a rotor and a generator connected to the rotor, wherein the first group of wind turbines includes more wind turbines than the second group of wind turbines;
   a measuring system which is configured to determine individual power productions of the wind turbines of the first group of wind turbines and to determine a wind condition for the second group of wind turbines; and,
   a wind farm control system which is configured to:
      calculate an actual power output for each of the wind turbines in wind farm;
      calculate an estimated possible maximum power output for each of the wind turbines in the wind farm based on the wind condition;
      operate the first group of wind turbines in a non-curtailed mode;
      operate the second group of wind turbines in a curtailed mode;
      determine an actual power production of the first group of wind turbines by summing the actual power output from the wind turbines in the first group;
      calculate a possible maximum power production of the second group of wind turbines by summing the estimated possible maximum power output from the wind turbines in the second group;
      calculate a possible maximum power output of the wind farm using the actual power production of the first group and the possible maximum power production of the second group;
      calculate a desired power reserve for the possible maximum power output of the wind farm; and
      calculate a power setpoint for each of the wind turbines of the second group so that an expected power production of the second group of wind turbines substantially matches a difference between the possible maximum power production and the desired power reserve.

18. The wind farm of claim 17, wherein the wind farm control system is configured to update an allocation of the wind turbines of the wind farm to the first group and the second group.

19. The wind farm of claim 17, wherein the wind farm control system is configured to determine expected losses in the wind farm, and to calculate the possible power output of the wind farm as a sum of the actual power production of the first group and the possible maximum power production of the second group reduced by the expected losses.

20. The wind farm of claim 17, wherein the measuring system comprises at least one anemometer.

* * * * *

UNITED STATES PATENT AND TRADEMARK OFFICE
CERTIFICATE OF CORRECTION

PATENT NO. : 9,453,497 B2
APPLICATION NO. : 14/218137
DATED : September 27, 2016
INVENTOR(S) : Ubben et al.

It is certified that error appears in the above-identified patent and that said Letters Patent is hereby corrected as shown below:

On the Title Page

In Item (71), under "Applicant", in Column 1, Line 2, delete "Schnectady," and insert -- Schenectady, --, therefor.

In the Specification

In Column 3, Line 64, delete "Wind turbine 100" and insert -- Wind turbine 10 --, therefor.

In Column 3, Line 66, delete "wind turbine 100" and insert -- wind turbine 10 --, therefor.

In Column 3, Line 67, delete "wind turbine 100" and insert -- wind turbine 10 --, therefor.

In Column 10, Line 37, delete "wind farm 10." and insert -- wind farm 300. --, therefor.

In Column 13, Line 66, delete "noise-reduced value 431," and insert -- noise-reduced value 411, --, therefor.

In Column 14, Lines 6-7, delete "noise-reduced value 431," and insert -- noise-reduced value 411, --, therefor.

In Column 14, Line 17, delete "noise-reduced value 431," and insert -- noise-reduced value 411, --, therefor.

Signed and Sealed this
Eighteenth Day of July, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,453,497 B2

In the Claims

In Column 18, Line 27, in Claim 6, delete "condition at least for" and insert -- condition for --, therefor.

In Column 18, Line 52, in Claim 10, delete "setpoint at least for" and insert -- setpoint for --, therefor.

In Column 19, Line 8, in Claim 14, delete "turbine" and insert -- farm --, therefor.

In Column 19, Line 40, in Claim 14, delete "turbines" and insert -- turbine --, therefor.

In Column 19, Line 46, in Claim 15, delete "comprising;" and insert -- comprising: --, therefor.